July 8, 1958 S. MYERSON Re. 24,502

EXPANSIBLE WRIST WATCH BAND

Original Filed March 9, 1953

INVENTOR.
SIMON MYERSON

BY
Kenway, Jenney, Witherspoon & Hildreth
ATTORNEYS

United States Patent Office

Re. 24,502
Reissued July 8, 1958

24,502

EXPANSIBLE WRIST WATCH BAND

Simon Myerson, Newton, Mass.

Original No. 2,751,132, dated June 19, 1956, Serial No. 340,953, March 9, 1953. Application for reissue June 17, 1957, Serial No. 667,062

7 Claims. (Cl. 224—4)

Matter enclosed in heavy brackets [ ] appears in the original patent but forms no part of this reissue specification; matter printed in italics indicates the additions made by reissue.

Expansible wrist watch bands of the type that may be slipped on or off without disconnecting the sections generally fall into one of the two classes, viz., those embodying foldable links, and those comprising links and associated retracting springs. The former type is subject to the objection that in time the links become so worn that they are apt to unfold with a result that the wrist watch and band may accidentally drop off the wrist; and the latter type is objectionable in that it is quite difficult to select the precise number of links either to prevent uncomfortable binding of the band about the wrist or avoid objectionable looseness which is apt to cause the watch and band to slide off the wrist or shift its position on the wrist if the arm is quickly extended. If the band is under sufficient tension to prevent objectionable looseness, it tends to indent the skin and irritate the wearer.

The principal objects of the present invention are to overcome the aforementioned objectionable features and to provide a band for a wrist watch or the like article which is of simple design and of pleasing appearance, which is of strong and durable construction, which may be readily slipped on and off the wrist, which may be made secure on the wrist without binding or otherwise irritating the wearer and which can be manufactured at a relatively low cost.

Further objects relate to various features of construction and will be apparent from a consideration of the following description and the accompanying drawings, wherein:

Fig. 6 is an isometric of the end connector for attaching one of the sections to a wrist watch or the like;

In accordance with the present invention I provide a band for a wrist watch or the like article, which comprises two relatively non-expandable sections, each having an end attachable to the wrist watch, and the adjacent ends of these sections carry interengaging coupling means such as a buckle, hook, snap or the like by which they may be detachably secured together. A retracting member or band is juxtaposed to the two sections and connected therewith so as to extend across the coupling means normally to hold the two sections in position to complete the encirclement of the wrist. The sections are preferably so constructed as to provide a sheath or housing for the retracting member and the parts are made from material which not only provides an attractive appearance, but also is acceptable to the skin of different people. In any case, the retracting member is sufficiently expandable so that the ensemble may be slipped [or] *on* or off the wrist when the coupling members are detached, but it is preferably so constructed and arranged to exert only sufficient force to bring the sections back to normal wrist encircling position without binding the wrist of the wearer.

Figure 1:
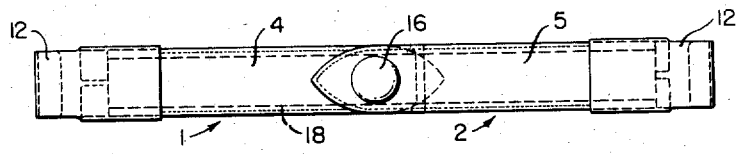
Fig. 1 is a top plan view of a wrist watch band constructed in accordance with the present invention.
Figure 2:
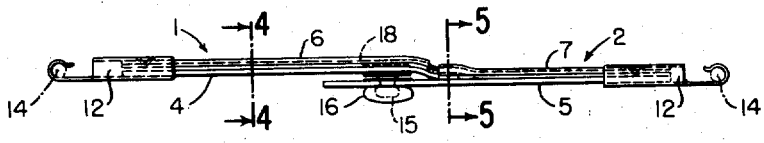
Fig. 2 is a side elevation showing the sections in retraced position.
Figure 3:
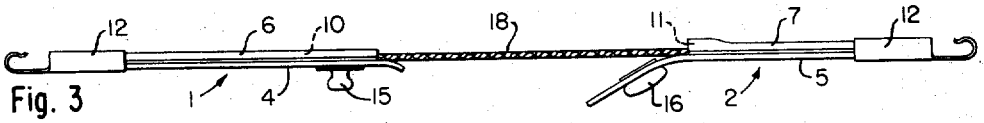
Fig. 3 is a side elevation showing the sections expanded.
Figure 4:
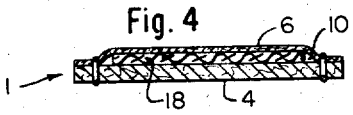
Fig. 4 is an enlarged section on the line 4—4 of Fig. 2.
Figure 5:
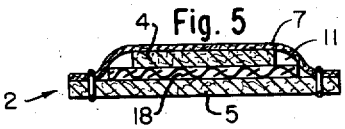
Fig. 5 is an enlarged section on the line 5—5 of Fig. 2.
Figure 6:
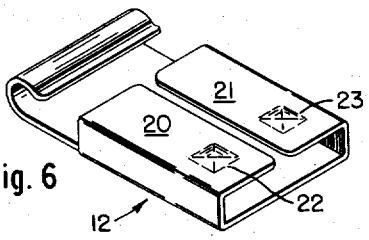

The accompanying drawings show different embodiments of the invention chosen for the purpose of illustration and referring to Figs. 1 to 6 the numerals 1 and 2 designate the two detachable, relatively non-expandable sections which may be of leather or the like suitable material. These sections comprise outer and inner elongate straps 4, 5, 6 and 7, which may be of leather, plastic or other suitable material, stitched together at their elongate edges to provide sheaths 10 and 11 (Figs. 4 and 5).

The opposite ends of the sections 1 and 2 [carry] *include* attaching hooks 12 (Fig. 6) by means of which they may be secured to the coupling pintles 14 (Fig. 2) of a wrist watch (not shown), and the adjacent ends of the outer straps 4 and 5 carry interengaging locking means here shown as a snap fastener having male and female parts 15 and 16.

A retracting member, here shown in the form of an elastic webbing 18, has its opposite ends secured to the opposite end portions of sections 4 and 5 and to this end the inwardly directed flanges 20 and 21 (Fig. 6) of the [coupling] *hooks* 12 may be formed with inwardly struck detents 22 and 23 effective to hold the parts together. The retracting member 18 extends through the sheath 10, across the adjacent ends of the sections 1 and 2 and through the sheath 11, as shown in Figs. 2 to 5, thus being entirely concealed when the band is worn. The length and retractability of the web 18 is such that is preferably exactly effective to hold the two sections in normal retracted position (Figs. 1 and 2) so that the coupling member is in position to be interlocked, but its elasticity is such as to permit sufficient expansion when the coupling member is disengaged to allow the band to be slipped on or off the wrist.

In order to avoid both objectionable binding and looseness of the band about the wrist of the wearer, it is preferable that the hooks 12 are not at first permanently attached to the opposite ends of the sections 1 and 2 and hence the coupling member is first interlocked and the hooks 12 are applied to the pintles 14 of the wrist watch. The opposite ends of the sections are then slipped beneath the flanges 20 and 21 of the hooks 12 and while holding the parts together the ensemble may be fitted about the wrist of the wearer to determine the precise length of the two sections necessary to secure a snug comfortable fit, after which the detents 22, 23 are pressed inwardly so as permanently to hold the parts together. However, the invention is not limited to this feature since very desirable results may be achieved by the manufacture of a sufficient range of sizes.

With this construction and arrangement of parts the sections 1 and 2 are effective to provide the encircling band which holds the ensemble in place and prevents expansion; and the retracting member 18 not only provides a second band preventing the ensemble from slipping off the wrist in event the coupling member [18] accidentally becomes disengaged but also allows sufficient expansion to permit the ensemble to be quickly slipped on or off the wrist.

Figure 7:
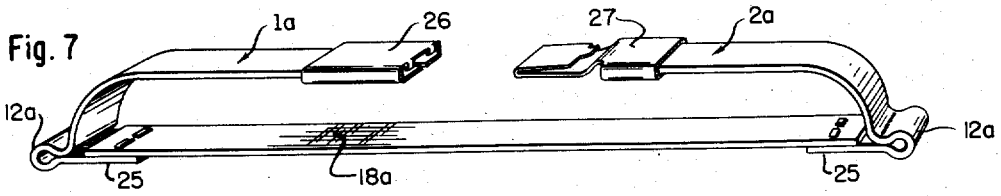
Fig. 7 is a perspective of a modified form of the invention.

The embodiment shown in Fig. 7 is, in principle, the same as that of the previously described embodiment, but provides a less expensive construction designed to be made in a range of sizes. In this embodiment the sections 1a and 2a each consists of a leather strap or the like, the opposite end portions of which are folded inwardly to form small loops 12a for receiving coupling pintles 14 of a wrist watch and inwardly directed flaps 25 to which the ends of a retracting member 18a are stitched or otherwise secured, the retracting member preferably being slightly narrower than the sections 1a and 1b so as to be substantially concealed thereby, when the band is worn. The adjacent ends of the sections carry suitably interlocking fastening elements 26 and 27 by means of which they may be detachably secured together, the construction and arrangement of parts being such that the retracting member 18a normally holds the sections together so that the elements 26 and 27 may be coupled, but preferably without exerting a retracting force on the sections when coupled together. In all material particulars the band of this embodiment is the same as that above described.

Figure 8:
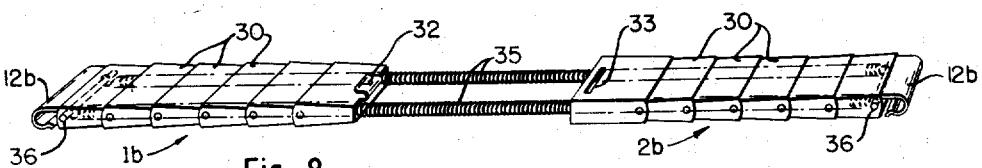
Fig. 8 is a view similar to Fig. 7, but showing a further embodiment of the invention.

The embodiment shown in Fig. 8 is also the same, in principle, as those previously described and each of the sections 1b and 2b consists of a plurality of pivotally interconnected tubular links 30. The outer link of each section is formed with an integral hooked extension 12b by which the section may be secured to the pintle 14 of a wrist watch. The inner link of section 1b is formed with an integral hook 32 and the inner link of section 2b is formed with a slot 33 which receives the hook 32 so as to couple the sections in normal retracted position. The retracting member may consist of one or more tension springs 35 extending through the links 30 of the two sections with their opposite ends secured to the outer links by pins 36. Here again the springs 35 are effective to retract the sections to permit the inner links to be interlocked, and thus the sections are held in normal position as in the previously described embodiment.

Figure 9:
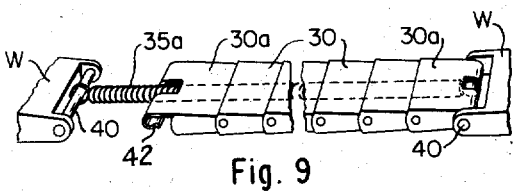
Fig. 9 is a view showing a modification of the embodiment shown in Fig. 8.

The modification shown in Fig. 9 embodies the same basic construction as shown in Fig. 8, but is provided with a single retracting spring or band 35a, one end of which is coupled to one of the pintles 40 of the wrist watch W and the opposite end is coupled to the other pintle 40, it being understood that the coupling members of the watch W are shown separated merely for the purpose of illustration. One or both terminal links 30a of the non-expandable section is formed with a locking tongue 42 by means of which the terminal link may be detachably secured to the adjacent pintle 40. It will be noted that the links 30, 30a provide a non-expandable, detachable band and the spring 35a provides a non-detachable, expandable band which holds the ensemble about the wrist of the wearer, even if the non-expandable band 30, 30a should be accidentally disconnected.

While reference has been made herein to a watch, as a component of the band, the watch may be omitted and the ends so joined as to make a continuous band or bracelet. In such cases, the bracelet will comprise a non-expandable element completely encircling the wrist and an expandable element also completely encircling the wrist. The said element may have a segment of the band in common, as in the case of the wrist watch.

While I have shown and described different desirable embodiments of the invention it is to be understood that this disclosure is for the purpose of illustration and that various changes and modifications may be made without departing from the spirit and scope of the invention as set forth in the appended claims.

I claim:

1. A wrist watch band comprising two sections, corresponding ends of which may be attached to a wrist watch, the other ends of said sections having interengageable coupling means by which such ends are detachably connected when the band is worn about the wrist, each of said sections having an elongate sheath, and an elongate retracting member having a portion within one sheath and another portion within the other sheath, said retracting member extending across said coupling means and its opposite ends being anchored to the respective sheaths, [the normal length of said retracting member being less than that of the two section so as to exert a retracting force which normally holds the two sections snugly about the wrist,] the expanded length of said retracting member being sufficient to permit removal of the band from the wrist when said coupling means are detached.

2. A wrist watch band comprising two sections, corresponding ends of which may be attached to a wrist watch, the other ends of said sections having interengageable coupling means by which such ends are detachably connected when the band is worn about the wrist, each of said sections having an elongate flexible member, and elongate retracting means having a portion adjacent to one flexible member, and another portion adjacent to the other flexible member, said retracting means extending across said coupling means and its opposite ends being anchored relative to the watch when the band is attached thereto, [the normal length of said retracting means being less than that of the two sections so as to exert a retracting force which normally holds the two sections snugly about the wrist,] the expanded length of said retracting means being sufficient to permit removal of the band from the wrist when said coupling means are detached.

3. A wrist watch band as set forth in claim 2, wherein said retracting means comprises a tension spring.

4. A wrist watch band as set forth in claim 2 wherein the opposite ends of said retracting means are anchored adjacent to the outer ends of said sections.

5. A wrist watch band as set forth in claim 2 wherein each of said sections comprises a plurality of pivotally interconnected links.

6. A wrist watch band as set forth in claim 5 wherein said links are hollow and wherein said retracting means extends through said hollow links.

*7. A wrist band comprising an elongate flexible member, securing means for connecting opposite ends of said member to form therewith a first closed circle about the wrist of the wearer including coupling means detachable to permit opening said circle, elongate retracting means associated with said member and securing means to form therewith a second closed circle about the wrist of the wearer independent of said coupling means, said retracting means being longitudinally yieldable from a contracted length less than that required to permit removal of the band from the wrist over the hand to an expanded length equal to said required length, said member with said coupling means attached being adapted to maintain a maximum length less than said required length to prevent said retracting means from yielding to said expanded length and to inhibit such removal of the band from the wrist, the said coupling means being manually detachable to free said retracting means of the restraint of said member so that said retracting means may be expanded to permit such removal of the band from the wrist.*

References Cited in the file of this patent or the original patent

UNITED STATES PATENTS

| | | |
|---|---|---|
| 1,315,729 | Jolly | Sept. 9, 1919 |
| 1,616,215 | Chilson | Feb. 1, 1927 |
| 2,517,011 | Meyers | Aug. 1, 1950 |
| 2,558,007 | Smith | June 26, 1951 |
| 2,600,232 | Feid | June 10, 1952 |
| 2,639,067 | Hirsch | May 19, 1953 |
| 2,686,622 | Augenstein | Aug. 17, 1954 |
| 2,695,740 | Kolbe | Nov. 30, 1954 |

FOREIGN PATENTS

| | | |
|---|---|---|
| 280,923 | Switzerland | May 16, 1952 |
| 729,182 | France | Apr. 25, 1932 |
| 814,672 | Germay | Sept. 24, 1951 |